United States Patent [19]

French

[11] 4,219,693
[45] Aug. 26, 1980

[54] CONNECTOR SECURITY COVER ASSEMBLY

[75] Inventor: Terry W. French, Crawfordsville, Ind.

[73] Assignee: Cablevision Products Corp., Lafayette, Ind.

[21] Appl. No.: 932,529

[22] Filed: Aug. 10, 1978

[51] Int. Cl.² .......................................... H02G 15/10
[52] U.S. Cl. ..................... 174/135; 174/92;
174/138 F; 220/4 E; 339/39; 339/82
[58] Field of Search ............... 174/92, 138 F, 135;
339/37, 39, 75 P, 80, 82, 141, 208; 138/162, 166;
220/4 E; 200/303; 285/419

[56] References Cited

U.S. PATENT DOCUMENTS

| | | | |
|---|---|---|---|
| 3,705,378 | 12/1972 | Elkins | 339/208 X |
| 3,727,749 | 4/1973 | Martin | 220/4 E X |
| 3,757,031 | 9/1973 | Izraeli | 174/92 X |
| 4,027,096 | 5/1977 | Waddington et al. | 339/208 X |
| 4,029,896 | 6/1977 | Skinner | 174/92 X |

FOREIGN PATENT DOCUMENTS

| | | | |
|---|---|---|---|
| 1936039 | 1/1970 | Fed. Rep. of Germany | 339/208 |
| 2334429 | 1/1975 | Fed. Rep. of Germany | 174/92 |
| 816918 | 7/1959 | United Kingdom | 174/92 |
| 1350378 | 4/1974 | United Kingdom | 174/92 |

Primary Examiner—Bruce A. Reynolds
Assistant Examiner—E. F. Borchelt
Attorney, Agent, or Firm—Woodard, Weikart, Emhardt & Naughton

[57] ABSTRACT

A pair of identical, semicylindrical shells, each having a latch and a socket, are snapped together around a coaxial cable and connector assembly. The shells are made of comparatively brittle plastic material so that, once snapped together, they cannot be separated without fracture thereof, whereupon the fact of tampering with them is readily apparent.

6 Claims, 7 Drawing Figures

CONNECTOR SECURITY COVER ASSEMBLY

BRIEF SUMMARY OF THE INVENTION

First and second shells, each having a socket portion and a latch portion are latched together by a snap action to enclose and protect a conductor connector in a chamber formed by the shells when latched together. The shells are not removable from each other without destruction of one or the other.

DETAILED DESCRIPTION

In the communications field, many services are provided by means of electrical cables. Some examples are telephone, telegraph, and television. At times, either before or after installation of a service, it is desirable to identify connectors, cover connectors, and detect instances of tampering. This invention is directed toward meeting that need.

Figure 1:
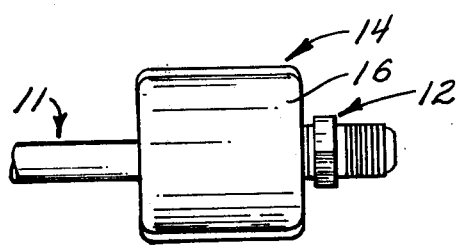
FIG. 1 is an elevational view of a connector security cover assembly enclosing a portion of a coaxial cable and connector assembly.
Figure 2:
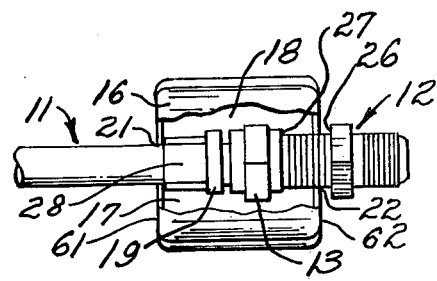
FIG. 2 is a view of the assembly of FIG. 1, with a portion of the wall broken away to show details of the cable and connector assembly.
Figure 7:
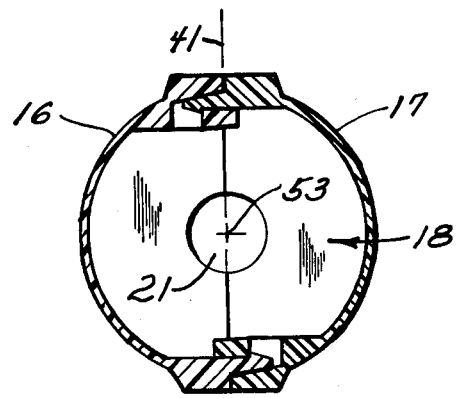
FIG. 7 is a section through an assembly of two shells latched together, the section being taken at the same location as line 6—6 in FIG. 3.
Figure 4:
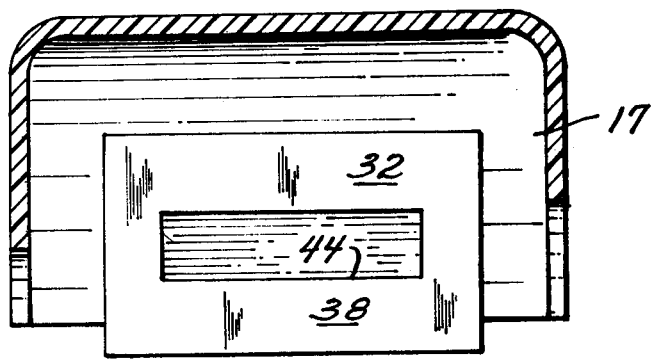
FIG. 4 is a section through the shell of FIG. 3 and taken on a line and viewed in the direction of the arrows 4—4 in FIG. 3.

Referring to the drawings, FIG. 1 shows coaxial cable 11 having an F-61 cable television fitting 12 connected to it by the nut 13. The security cover 14 of this invention comprises two shells 16 and 17 (FIG. 7) snapped together and forming a chamber 18 therein covering the nut 13 and portions of the cable 11 and fitting 12. These shells are inseparable without fracture of a portion of one or the other. Therefore they prevent access to the nut 13, so that it is impossible for someone to unthread the nut 13 from the fitting 19 affixed to cable 11, without breaking open the cover assembly. In addition, the cover assembly provides some protection of the assembly from the elements, insects, and also provides an opportunity for labeling the connection by labeling the cover assembly.

The aperture 21 in the left-hand end 61 of the cover assembly is nominally one-quarter inch diameter to provide a sliding fit on the exterior of the conventional television cable 11. The aperture 22 at the opposite end 62 is nominally three-eighth inch diameter to slidingly fit the F-61 cable television fitting 12. Therefore the cover assembly can slide in an axial direction to the left in the direction of arrow 23 and to the right in the direction of arrow 24 to an extent limited by abutment of the right-hand end with the shoulder 26 of fitting 12 during movement of the cover assembly in the direction of arrow 24, or with the end 27 of nut 13 during movement in the left-hand direction. Depending upon the positioning of the shoulder 26 with respect to the nut end 27, right-hand movement of the cover assembly may be limited by engagement of the left-hand end of the cover assembly with a portion 28 of the fitting on the cable 11.

Referring now to FIGS. 3 through 6, even though the apertures 21 and 22 are of different sizes, the construction of the shells according to this invention makes it possible to use identical shells to complete the assembly. One such shell is shown in FIGS. 3 through 6.

Figure 6:
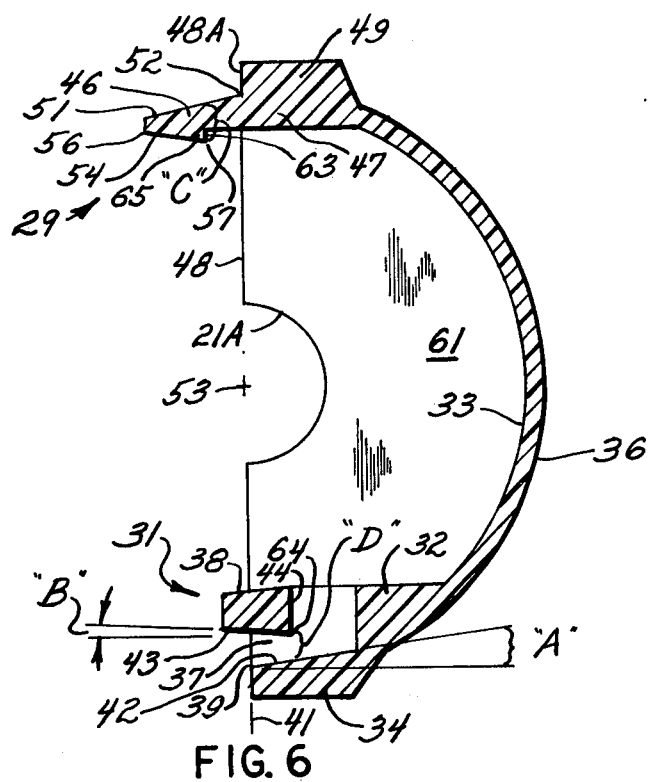
FIG. 6 is a section through the shell taken at line 6—6 in FIG. 3 and viewed in the direction of the arrows.
Figure 3:
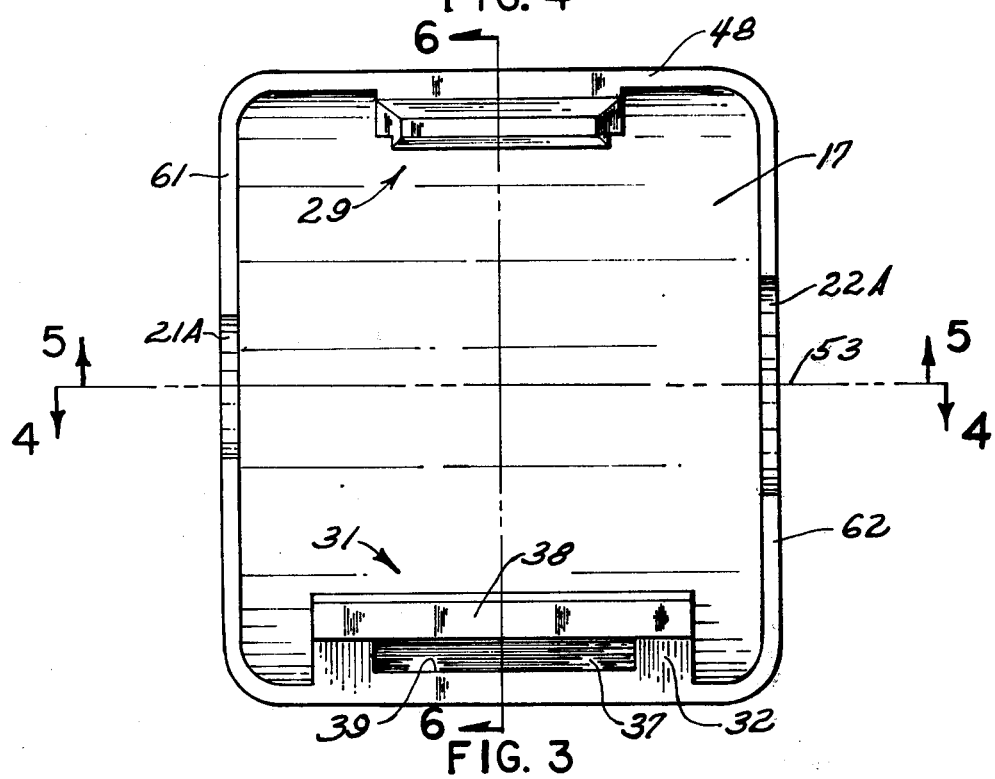
FIG. 3 is an enlarged elevational view of one of the two identical shells included in the cover assembly of FIGS. 1 and 2.
Figure 5:
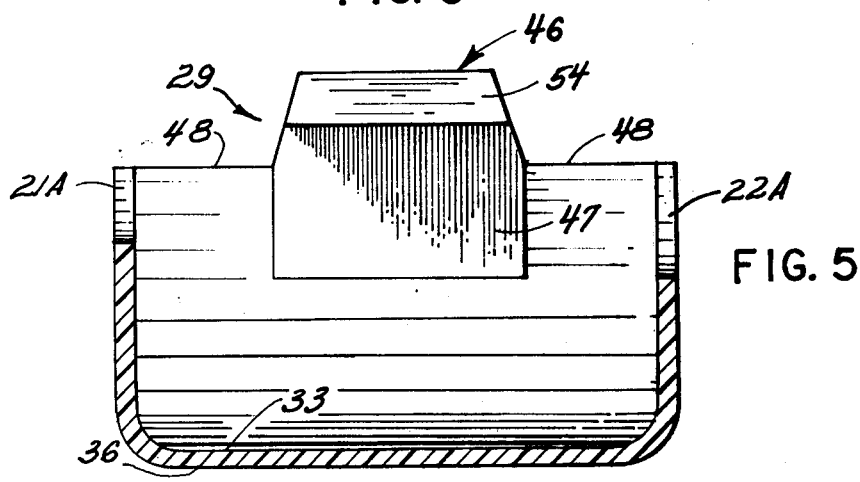
FIG. 5 is a section through the shell taken on the same line as FIG. 4 but viewed in the direction of the arrows 5—5 in FIG. 3.

Referring to FIG. 3, the shell is generally rectangular as it appears in this view, with rounded corners. The wall thickness is typically 0.030, and the material is typically Foster Grant No. 1065 G.P. styrene material. Other materials having similar properties might also be used. The shell includes a latch portion 29, and socket portion 31. The socket portion includes a boss 32 in an otherwise cylindrical interior wall 33 apparent in FIG. 6. An exterior boss 34 is provided on the outside cylindrical surface 36 as also shown in FIG. 6. This provides ample space for a slot 37 typically 0.438 inches long and 0.066 inches wide (dimension "D" FIG. 6). The top of this slot is defined by a retaining bar 38. This bar, cooperating with the aformentioned bosses 32 and 34 provides the slot 37 which has an entrance 39 at vertical plane 41. The lower wall 42 slopes upwardly from the entrance edge at an angle "A" of approximately 10 degrees. The upper entrance wall 43 of the slot and which is the bottom of bar 38, slopes upwardly at an angle B of about one degree. Bar 38 has a retaining abutment wall 44 which is parallel to plane 41.

The latch portion includes latch 46 projecting from the boss 47 on the cylindrical inner wall 33. It projects outward from the shell cavity opening perimetrical edge 48 (FIGS. 3, 5 and 6) and from the boss 49 which extends outward from the outer cylindrical surface 36 of the shell and provides a face 48A which is a continuation of the edge 48 in the parting plane 41. The latch has an inclined (at 10 degrees) upper face 51 terminating at the line 52 where it meets the face 48A at the parting plane. This line 52 is at the same radial distance with respect to the axis 53 in plane 41 as is the entrance edge 39 of slot 37. The lower face 54 of the latch slopes at 10 degrees from the leading edge 56 downward to the trailing edge 57 toward the axis 53. Vertical surface 63 rises from edge 57 to form a downwardly projecting lug 65 on the latch.

The faces 51 and 54 are located with respect to the axis 53 and the bosses 34 and 49 such that, when an identical shell 16 is placed adjacent shell 17 with the socket of shell 16 at the top and latch thereof at the bottom, the respective latches of the shells will be received in the corresponding slots in the sockets whereby the assemblies can be placed together with the corresponding edges 48 thereof in direct abutment around the perimeter of the unit. At such time, the semicircular notch 21A in the end wall 61 of shell 17 will cooperate with the corresponding semicircular notch in shell 16 to provide the aperture 21 concentric about axis 53, and semicircular notch 22A in shell 17 will cooperate with the corresponding semicircular notch in shell 16 to form aperture 22 in the assembly, also concentric about axis 53. Also the vertical surfaces 63 of lugs 65 will abuttingly interlock with the abutment walls 44 of bars 38 to latch the shells together.

It is important to the achievement of the objective of the invention, that once the two shells are snapped together, they cannot come apart without destroying either one or the other of the shells. In this connection, even a crack without a complete fracture, would be considered destruction of a part. To assist in assurance that the parts will remain together, they are dimensioned such that the nominal thickness of the latch between the lug edge 57 and the latch upper face 51 (dimension "C" in FIG. 3) is at least equal to the nominal dimension "D" at the narrowest point in the latch entrance slot 37. Also it is desirable that the distance from the edge 52 (at the intersection of the latch top surface 51 and the surface 48) to the bottom (trailing) edge 64 of the bar 38 (at the bottom of the abutment surface 44 of the retainer bar 38) be greater than the distance between the edge 57 at the bottom of the lug and the bottom entrance edge 39 at the bottom of the entrance slot 37. Also, to maintain reasonable tightness of the shells together, it is desirable that the distance between the permetrical edge 48 at parting plane 41 and the abutment face 44 be from two thousandths to twelve thousandths less than the distance between edge 48 at the parting plane 41 and the abutment face 63 of the latch lug.

A typical overall length from the end 61 to end 62 of the generally cylindrical assembly is 0.938 inches, while a typical overall diameter is one inch. As mentioned above, a suitable material would be a G.P. styrene as marketed by Foster Grant under number 1065. The above mentioned sloping surfaces 51 and 54 on the latch, and the sloping surfaces 42 and 43 in the socket, facilitate assembly, and provide any camming of the lug as may be needed to facilitate entry into the socket. The vertical thickness of the bar 38 in a direction from the exterior to the center 53 is less than the thickness in a direction tangent to a circle about axis 53 and touching the bar at the parting plane. This accommodates limited flexibility in the bar, to permit its deformation toward the center 53 in the event the overall thickness at the lug abutment is greater than the minimal width of the slot, but precludes any flexing of the bar in a tangential direction. It thus prevents any flexing such as would accommodate separation of the shells.

Since the apertures 21 and 22 are sized to fit the components entering the chamber within the shells, and since the facing and meeting edges of the two shells are in abutment, the chamber is closed to the exterior and precludes any tampering. It should be understood that the sizes and shapes of the end wall notches can vary depending upon the type of conduits or connectors or conductors to be connected and whose connection is to be covered and protected by the assembly. While any elongate conductor is likely to have an axis of symmetry, (which is colinear with axis 53 in the assembly illustrated herein where the illustrated cable and connector are cylindrical,) the present invention could be adapted to conductors of various cross sections by simply changing end wall notch shape and (possibly) location. It is possible that only one end of each shell would be notched and, when assembled, would still provide a pair of apertures at opposite walls of the chamber.

Since plastic materials usually have some resiliency, and particularly where a latching effect is desired, care has been taken in the present invention that the resiliency which may exist in the comparatively thin cylindrical wall sections, is not useful to defeat the objective. Accordingly, wall sections at the latches and sockets are thickened to avoid any resilient deformation in those areas such as would accommodate unlatching of the shells, once latched.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:
1. A connector security cover assembly comprising:
first and second shells, each shell having a socket portion and a latch portion, with the latch portion of the first shell being received and latched in the socket portion of the second shell, and the latch portion of the second shell being received and latched in the socket portion of the first shell, whereby said shells are latched together, said shells having matching edges such that, when latched together, they form a substantially closed chamber;
said cover assembly having at least two apertures at locations on said shell edges at opposite boundaries of said chamber to accomodate conductor means having an axis of symmetry extending through said apertures and in said chamber;
said latch portions having lugs with lug abutments, and said socket portions having retainer abutments abuttingly engaging said lug abutments to latch said shells together;
said lug abutments projecting generally radially inward toward a line extending through said apertures;
said retainer abutments being on retainer bars, there being one such retainer bar in each socket portion, there being an entrance slot between said retainer bar and a wall of said shell at said socket portion,
said lug having a maximum thickness at said abutment thereof sufficient to interfere with said socket portion wall and said bar during insertion of said lug through said slot,
said lug abutments and retainer abutments of said latch and socket portions being entirely inside said chamber after latching, and wall thickness of said shells at said latch and socket portions being greater than elsewhere to preclude resilient deformation sufficient to unlatch said shells whereby said latch portions are immune to unlatching from outside said chamber after said shells are latched together, without destruction of at least part of said cover assembly.
2. The assembly of claim 1 wherein:
said first and second shells are identical; and
said apertures are formed by notches on opposite walls of each shell, the notch on one wall being smaller than the notch on the other wall thereof, whereby the aperture at one boundary of the chamber is smaller than the aperture at the other boundary, whereby the smaller aperture is adapted to fittingly receive a coaxial electrical cable, and the larger aperture is adapted to fittingly receive part of a coaxial cable connector therein.
3. The assembly of claim 1 wherein:
the material of said shells is such that deformation necessary to effect unlatching is sufficient to break the material.
4. The assembly of claim 3 wherein:
the material is general purpose styrene.
5. The assembly of claim 1 wherein:

the said maximum thickness is greater than the width of said entrance slot.

6. The assembly of claim 5 wherein:
said retainer bar is thinner in a radial direction than in a direction tangent to a circle about said line at said bar, to permit limited resilient widening of said slot to admit said lug, but return to normal position and slot width upon latching, whereupon the lug abutment and retainer bar abutment are in face-to-face abutting relationship.

* * * * *